US012589404B2

(12) United States Patent
Watson et al.

(10) Patent No.: US 12,589,404 B2
(45) Date of Patent: Mar. 31, 2026

(54) TEMPORARY PROTECTIVE DEVICE FOR FIRE PROTECTION SPRINKLERS

(71) Applicant: Minimax Viking Patent Management GmbH, Bad Oldesloe (DE)

(72) Inventors: Jason T. Watson, Hastings, MI (US); Lindsay Marie Barker, Delton, MI (US); Shawn G. Orr, Grand Rapids, MI (US)

(73) Assignee: Minimax Viking Patent Management GmbH, Bad Oldesloe (DE)

( * ) Notice: Subject to any disclaimer, the term of this patent is extended or adjusted under 35 U.S.C. 154(b) by 583 days.

(21) Appl. No.: 17/888,980

(22) Filed: Aug. 16, 2022

(65) Prior Publication Data

US 2023/0057561 A1 Feb. 23, 2023

Related U.S. Application Data

(60) Provisional application No. 63/335,754, filed on Apr. 28, 2022, provisional application No. 63/234,275, filed on Aug. 18, 2021.

(51) Int. Cl.
*B05B 15/16* (2018.01)
*A62C 35/68* (2006.01)

(52) U.S. Cl.
CPC .............. *B05B 15/16* (2018.02); *A62C 35/68* (2013.01)

(58) Field of Classification Search
CPC ........... B05B 15/16; B05B 15/14; B05B 1/28; B05B 12/32; B05B 7/0087; B05B 7/0425;
(Continued)

(56) References Cited

U.S. PATENT DOCUMENTS 196,055 A 10/1877 Talcott
1,331,277 A 2/1920 Ramsey
(Continued)

FOREIGN PATENT DOCUMENTS

KR 101287348 7/2013
KR 101900039 B1 9/2018
WO WO 2020/092215 5/2020

OTHER PUBLICATIONS

The Viking Corporation, Technical Data, Cocoon Sprinklers, F102500, Sprinkler 138a, Oct. 12, 2012, 2 pages.
(Continued)

*Primary Examiner* — Tuongminh N Pham
(74) *Attorney, Agent, or Firm* — Perkins Coie LLP

(57) ABSTRACT

Temporary devices and methods for providing a protected installed fire protection sprinkler assembly in an area, building, occupancy or worksite under construction and/or renovation. A protective device is embodied as a cap to house and protect the installed sprinkler assembly within an internal chamber. The protective cap includes a receiver end that forms a gription surface engagement with a peripheral surface of the sprinkler assembly. The cap provides an aerosol shield having peripheral shielded openings sufficient for heated gas to enter the internal chamber to thermally actuate the housed sprinkler assembly in the event of a fire; and yet limit the flow of aerosol paint spray and other debris into the chamber during construction or renovation activities that could damage or adversely impact sprinkler performance. The protective cap is displaced from the sprinkler assembly upon sprinkler actuation to permit the sprinkler to operate and distribute firefighting fluid without interference.

20 Claims, 7 Drawing Sheets

(58) Field of Classification Search
CPC ........ B05D 1/32; Y10S 16/02; Y10S 165/311; Y10S 165/312; Y10T 137/7043; Y10T 137/7051; Y10T 137/7047; E03C 1/084; E03B 7/10; E03B 7/12; F24F 1/40; F24F 2013/0616; F24F 2013/202; F24F 2013/205; F24F 13/06; F24F 13/088; F24F 13/20; F21V 15/02; G06F 1/20; H05K 7/20
See application file for complete search history.

(56) References Cited

U.S. PATENT DOCUMENTS

| | | | | |
|---|---|---|---|---|
| 2,890,758 | A | 6/1959 | Pfalzgraff et al. | |
| 3,388,747 | A | 6/1968 | Hodnett | |
| 3,393,746 | A | 7/1968 | Hodnett | |
| 3,727,695 | A | 4/1973 | Danton | |
| 3,801,014 | A | 4/1974 | Cantales | |
| 3,917,941 | A * | 11/1975 | Trevithick | F21V 15/02<br>362/376 |
| 5,248,013 | A * | 9/1993 | Hogue | F16D 55/36<br>188/264 G |
| 6,131,822 | A | 10/2000 | Farmer, Jr. | |
| 6,374,919 | B1 * | 4/2002 | Neill | A62C 37/09<br>169/41 |
| 10,744,358 | B1 | 8/2020 | Krayeski et al. | |
| 2004/0134670 | A1 | 7/2004 | Orr et al. | |
| 2007/0256844 | A1 | 11/2007 | Blasing et al. | |
| 2009/0194298 | A1 | 8/2009 | Sundholm | |
| 2010/0089597 | A1 * | 4/2010 | Neeb | A62C 37/10<br>169/37 |
| 2022/0226683 | A1 | 7/2022 | Ouelette et al. | |

OTHER PUBLICATIONS

The Viking Corporation, Technical Data, Sprinkler Escutcheons, Form No. F_122698 20.10.09 Rev. 20.1, 9 pages.

* cited by examiner

TEMPORARY PROTECTIVE DEVICE FOR FIRE PROTECTION SPRINKLERS

PRIORITY DATA & INCORPORATION BY REFERENCE

This application claims the benefit of priority to U.S. Provisional Patent Application No. 63/234,275, filed on Aug. 18, 2021; and U.S. Provisional Patent Application No. 63/335,754, filed on Apr. 28, 2022, each of which is incorporated by reference in its entirety.

TECHNICAL FIELD

The present invention relates generally to the protection of fire protection sprinklers and more particularly to protected sprinkler assemblies and devices for protecting operational components of installed sprinklers during construction or maintenance operations.

BACKGROUND ART

Fire protection sprinklers generally include a sprinkler frame for installation with the inlet of the sprinkler frame connected to a firefighting fluid supply pipe and a fluid deflection member coupled to the frame for distributing firefighting fluid discharged from the sprinkler frame outlet. Automatic fire protection sprinklers include a seal assembly disposed in the frame outlet for controlling the fluid discharge and a thermally responsive trigger or element arrangement to support the seal assembly and define an unactuated state of the sprinkler. In the presence of a sufficient level of heat indicative of a fire, the thermally responsive trigger operates and releases its support of the seal assembly. Without the support of the trigger assembly, the seal assembly is ejected out the outlet under the operating pressure of the firefighting fluid supplied to the sprinkler. The fluid discharge impacts the fluid deflection member to address the fire and/or wet the surrounding area. The firefighting fluid is distributed at density and/or coverage area in accordance with the design of the sprinkler. Accordingly, proper actuation and operation of the sprinkler is dependent upon the operation of components of the installed sprinkler remaining free of damage and/or debris.

Automatic fire protection sprinklers are used in a variety of environments including, for example, residential buildings, commercial buildings and storage warehouses or storage facilities. For many construction or renovation projects, the water system and fire sprinkler system piping are completed before other phases of the building, such as, for example, framing or drywall hanging. It is desirable to place a fire protection system into service, at least temporarily, to provide effective fire protection of the construction or renovation site. However, placing automatic fire protection sprinklers into service on a construction site presents some problems of their own. For example, construction operations can expose the fire protection sprinklers to accidental damage from impact of moving materials, tools or equipment in the vicinity of the sprinklers. Impact damage to a sprinkler can result in dislodgement of the seal assembly and the unnecessary discharge of firefighting fluid into the construction site. Additionally, debris from cutting or spray-painting operations can damage or prevent the proper operation of the thermally responsive element or other components of the sprinkler. Accordingly, there is a need for protective devices and methods for installed fire protection sprinklers that can protect the sprinklers from accidental damage and/or debris during construction operation and which permit the proper operation of the sprinkler to provide temporary adequate fire protection to the construction site.

There are known protective devices or caps that are used to protect fire protection sprinklers. U.S. Patent Publication No. 2009/0194298 shows a protective element fastened about a sprinkler by a connection between a projection of the protective element and groove of the sprinkler to protect a triggering means and the nozzles of the sprinkler. The protective element prevents hot gas flowing to the triggering means in order to prevent an unwanted triggering. In order to place the sprinkler into a standby mode for fire protection, the sprinkler has a movable frame which displaces in response to firefighting medium being supplied to the sprinkler. The displacement of the sprinkler frame detaches the protective element from the sprinkler and places the sprinkler in standby mode for fire protection. Accordingly, the protective device of U.S. Patent Publication No. 2009/0194298, when in a protective position about the sprinkler, prevents the flow of hot gas to the trigger means and requires displacement of the sprinkler itself in order to detach the protective device. Sprinklers with a non-movable frame or installation would not have the necessary movement to detach such a protective device.

U.S. Patent Application Publication No. 2010/0089597 shows and describes a protective canopy that is disposed over an installed sprinkler to reduce tampering or accidental activation. The canopy works to prevent sprinkler tampering by providing a physical structure that conceals the sprinkler requiring physical removal to reach the sprinkler. In addition, the canopy can provide a visible warning and/or provide an alarm activation upon detachment to deter sprinkler tampering. The described canopy is constructed with apertures or a mesh sufficient to let in heat to activate the sprinkler housed therein without measurable delay. Moreover, the described canopy is attached to a surface surrounding a sprinkler escutcheon or an escutcheon itself by a magnetic or adhesive means provided the canopy is pushed clear of the sprinkler under sprinkler discharge to avoid significant impact on the sprinkler performance Given the manner in which the canopy is attached and its function to prevent tampering, the canopy is not shown or described to protect against accidental impact or damage from construction operations such as, for example, from a paint spray operation. Instead. U.S. Patent Application Publication No. 2010/0089597 describes the canopy being attached during a new construction to a wet or curing ceiling. e.g., after the ceiling is painted of finished.

U.S. Patent Application Publication No. 2007/0256844 shows and describes a method and apparatus for lock-out-tag out of sprinkler heads. The apparatus is described as providing protection for automatic sprinklers in the workspace of carpenters, electricians or similar tradesman where the movement of building materials, ladders or the like may inadvertently damage the fire protection sprinklers. One embodiment of the protection apparatus clamps over an installed fire protection sprinkler. The apparatus includes a number of openings to provide for limited functionality in which the openings permit heat and combustion products to contact the sprinkler, eventually actuating the sprinkler's heat-responsive trigger element and provide an opening through which extinguishing fluid can flow. Accordingly, one problem with the apparatus of U.S. Patent Application Publication No. 2007/0256844 is that the apparatus inhibits the complete fluid distribution performance of the actuated sprinkler. Moreover, the extent to which the protective apparatus delays the designed thermal response of the trigger element is unknown. The amount of delay in the thermal response of the sprinkler may be greater than what would be deemed acceptable for adequate fire protection. The protective apparatus of U.S. Patent Application Publication No. 2007/0256844 is shown as being substantially spherical in shape with circular openings generally evenly spaced over the spherical protective apparatus. The location and geometry of the openings provide multiple avenues through which foreign matter such as, for example, spray paint can enter unimpeded into the protective device and damage or negatively impact the sprinkler performance.

U.S. Pat. No. 10,744,358 is directed to a temporary sprinkler method for temporarily operating sprinklers and sensors during building alterations, renovations, additions or similar activities where personnel may trigger sprinkler systems during their chores. The methods disclosed are intended to minimize the possibility of damage during the building's construction/renovation. U.S. Pat. No. 10,744,358 does not however show or describe a protective device for the sprinklers to protect against accidental impact damage.

In light of the known protective devices for fire protection sprinklers, there remains a need for temporary protective devices for fire protection sprinklers that protect against damage from accidental impact or debris during construction, maintenance or renovation operations while at the same time permitting the installed sprinkler to be fully functional for actuation and operation.

DISCLOSURE OF INVENTION

Preferred embodiments are provided of a temporary protective device and method for temporary protection for an installed fire protection sprinkler. The preferred protection device is embodied as a protective cap for temporarily housing and protecting the installed sprinkler from foreign matter and/or unintended impact and damage that may occur during construction or renovation operations. More particularly, the protective cap is preferably configured for protecting the installed sprinkler from aerosol paint spray that may occur during wall or ceiling finishing operations. As a temporary protective device, the preferred protective cap also provides for sufficient fluid and heat exchange through the cap to actuate the housed sprinkler in the event of a fire in order to provide fire protection of the surrounding occupancy during the construction or renovation operations. Thus, preferred embodiments of the protective cap avoid or minimize the impact of any delay the cap may have on the thermal sensitivity of the sprinkler. More preferably, the protective cap provides sufficient communication of external air or gas with the sprinkler such that, in the event of a fire, the protected sprinkler assembly can respond with a thermal sensitivity that is at least equivalent to that of a Standard Response sprinkler. The preferred protective cap is located or disposed over the installed automatic sprinkler with a preferred securement and configuration that is sufficient to withstand or resist an impact force to remain in place, yet the securement can be released or disengaged for displacement of the cap upon thermal actuation of the sprinkler and upon discharge of the firefighting fluid from the sprinkler at the minimum operating pressure or greater. Accordingly, preferred embodiments of the protective cap are configured to: i) shield the sprinkler from paint spray; ii) permit external air or gas exposure to thermally actuate the protected sprinkler assembly in the event of a fire; and iii) provide for a flow from the actuated sprinkler to displace the cap from the sprinkler assembly to permit the sprinkler to distribute firefighting fluid unimpeded with a performance as designed. More particularly, preferred embodiments of the protective cap provide for a sprinkler housing with: i) a shielded configuration that permit sufficiently heated air or gas to operate the thermal responsive element of the sprinkler; yet shield the element from an amount of paint spray that would otherwise prevent the sprinkler from thermally responding at least as fast as an industry defined "Standard Response" sprinkler; and ii) a grip about the sprinkler that can be broken under a minimum fluid pressure of 7 psi discharged from the actuated sprinkler; and yet be maintained in order to keep the cap in place about the sprinkler assembly to protect the sprinkler from accidental impact and/or debris.

One preferred embodiment of a protective cap for an installed fire protection sprinkler assembly includes an open receiver end portion, a closed terminal end portion opposite the open receiver end portion and spaced apart from one another along a central longitudinal axis with a tubular body extending therebetween. The tubular body forms a preferred aerosol shield that extends between the open receiver end portion and the closed terminal end portion to define an internal chamber centered about the central longitudinal axis. As used herein, an aerosol shield is a structure that permits a fluid exchange therethrough for thermal activation of a thermal element shielded thereby; but configured to limit or prevent an amount of aerosol paint spray from passing therethrough that, if deposited on the thermal element, would otherwise prevent an acceptable level of thermal sensitivity and operating response as preferably characterized herein. The open receiver end portion is preferably defined by a plurality of angularly spaced apart gription segments partially circumscribing the central longitudinal axis. The tubular body preferably includes at least one louver channel for air or gas communication with the internal chamber in a preferred direction from the open receiver end portion toward the closed terminal end portion.

Another preferred embodiment of a protective device is a temporary sprinkler protective cap for protecting an installed automatic fire protection sprinkler assembly. The preferred protective cap includes an open receiver end portion for defining an engagement about the installed sprinkler; a closed terminal end portion opposite the open receiver end portion and spaced apart from one another along a central longitudinal axis. A tubular body preferably embodied as an aerosol shield extends between the open receiver end portion and the closed terminal end portion with the tubular body being centered about the central longitudinal axis to define an internal chamber for housing the installed sprinkler. The open receiver end portion is preferably defined by a plurality of engagement segments angularly spaced apart about the central longitudinal axis to engage and partially circumscribe the sprinkler assembly, preferably about an escutcheon plate of the sprinkler assembly. The aerosol shield preferably includes a plurality of openings located between the open receiver end portion and the closed terminal end portion for fluid communication with the internal chamber. In preferred embodiments of the cap, the plurality of openings defines shielded openings to provide fluid access for air or gas communication to the internal chamber in a direction from the open receiver end portion toward the closed terminal end portion to thermally actuate the sprinkler housed therein.

Preferred methods of protecting a fire protection sprinkler assembly are also provided. The fire sprinkler assembly includes a fire protection sprinkler having a minimum operating pressure and a thermally responsive element having a thermal sensitivity. The fire sprinkler assembly includes an escutcheon plate having a peripheral surface disposed about the fire protection sprinkler. The preferred method includes installing the fire protection sprinkler assembly; and providing a preferred protective cap proximate the escutcheon plate in which the protective cap has an aerosol shield that maintains the sensitivity of the thermal responsive element and allows the thermally responsive element of the fire protection sprinkler to actuate within the protective cap so that firefighting fluid is discharged from the fire protection sprinkler at least at the minimum operating pressure to displace the protective cap from the escutcheon plate. Embodiments of the preferred method include gripping the peripheral surface of the escutcheon plate with a protective cap to provide an aerosol shield that houses the sprinkler assembly, allows the thermally responsive element of the fire protection sprinkler assembly to thermally operate; and discharge firefighting fluid at least at a minimum operating pressure to displace the protective cap from the fire protection assembly. Gripping the escutcheon plate preferably includes forming a gription surface engagement between a plurality of spaced apart internal surfaces of the protective cap and the peripheral surface of the escutcheon plate that resists an impact force and displaces from the sprinkler assembly upon fluid discharge following sprinkler operation.

BRIEF DESCRIPTION OF DRAWINGS

The accompanying drawings, which are incorporated herein and constitute part of this specification, illustrate exemplary embodiments of the invention, and together, with the general description given above and the detailed description given below, serve to explain the features of the invention. It should be understood that the preferred embodiments are some examples of the invention as provided by the appended claims.

MODE(S) FOR CARRYING OUT THE INVENTION

Figure 1:
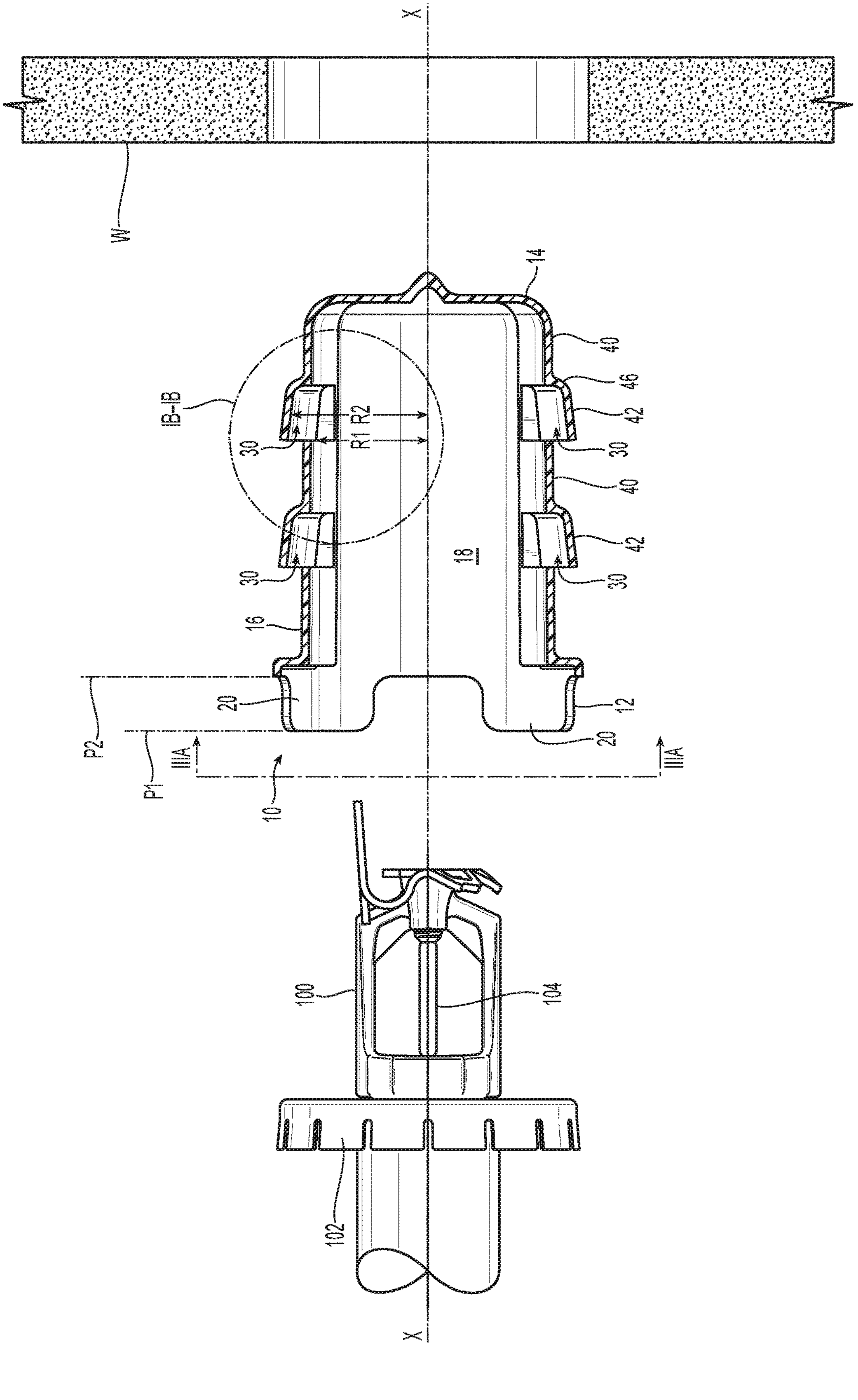
FIG. 1 is a partial cross-sectional exploded view of a temporarily protected sprinkler assembly.
Figure 1A:
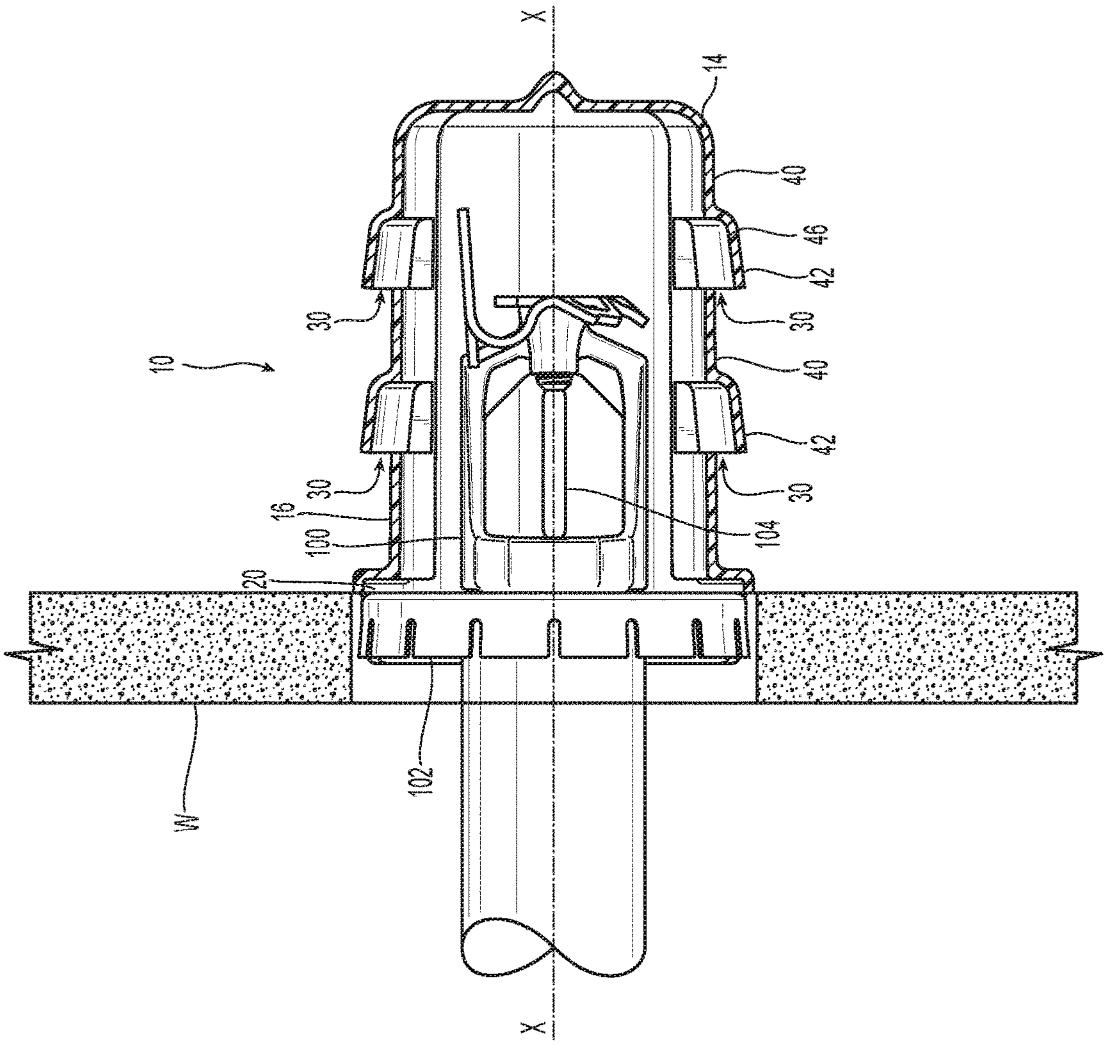
FIG. 1A is a partial cross-sectional view of the protected sprinkler assembly of FIG. 1.

Shown in FIGS. 1 and 1A are varying views of a preferred embodiment of an installed automatic fire protection sprinkler assembly 100 temporarily housed within a preferred embodiment of a protective cap 10. As illustrated, the fire protection sprinkler assembly 100 includes a sprinkler frame and fluid member, an escutcheon plate 102 and a thermally responsive element 104 having a thermal sensitivity supporting a seal assembly (not shown). The preferred cap 10 provides protection to the sprinkler from foreign matter and/or unintended impact and damage that may occur during construction operations, for example, during installation and/or finishing of the wall W. Preferred embodiments of the protective cap 10 provide for sprinkler protection from aerosol spray paint coming from finishing operations conducted proximate the sprinkler assembly 100. In protecting the sprinkler 100, the cap 10 preferably maintains the thermal sensitivity of the thermally responsive element 104 of the sprinkler after the construction/renovation operations are completed and the cap is removed. In addition to providing protection from accidental impact, the preferred protective cap 10 provides for sufficient air or gas and heat exchange therethrough to thermally actuate the thermally responsive element 104 and the housed automatic sprinkler 100 in the event of a fire. Accordingly, the sprinkler assembly 100 can be placed into service to provide fire protection of the surrounding occupancy during construction operations while the sprinkler is itself protected and guarded from accidental impact due to the construction operations.

In a preferred method of protecting an installed sprinkler, as shown in FIG. 1, the preferred protective cap 10 is located or disposed over the installed automatic sprinkler assembly 100 in its unactuated state. Depending upon the operational orientation of the sprinkler, the protective cap 10 can be oriented horizontally with respect to a vertical wall or vertically with respect to a horizontal overhead ceiling. For example, for the illustrative horizontal sidewall sprinkler assembly shown, the cap 10 is oriented horizontally with respect to the vertically extending wall W. With the cap 10 secured over the sprinkler assembly 100, the ceiling or wall W can be marked and a through hole formed therein. The protective cap 10 can include a central point or marker at its closed end to facilitate wall marking. The wall W can then be disposed over the protected sprinkler assembly, hung in place and finished. Generally, an automatic fire protection sprinkler has a minimum operating pressure, e.g., 7 psi. at which firefighting fluid is required to be delivered to the installed sprinkler so that upon sprinkler actuation, the fluid is discharged, at least at the minimum operating pressure, and distributed to effectively address a fire and/or wet the surrounding area in a desire manner. In protecting the installed sprinkler assembly 100, the protective cap 10 is preferably temporarily secured about the installed sprinkler assembly 100 with a securement that is sufficiently robust to withstand or resist an impact force to remain in place, yet sufficiently pliable or flexible so that the protective cap 10 is displaced from the sprinkler upon thermal actuation of the sprinkler and upon discharge of the firefighting fluid from the sprinkler assembly 100 at the minimum operating pressure, preferably at least 7 psi., or greater.

Preferred embodiments of the protective cap 10 include a generally tubular body with an open receiver end portion 12 for receiving the sprinkler assembly 100 and a closed terminal end portion 14 opposite the sprinkler receiving end portion 12, axially spaced apart from one another along a central longitudinal axis X-X. The tubular body surrounds or circumscribes the central axis X-X and extends between the open receiver end portion 12 and the closed terminal end portion 14 to define an internal chamber 18 for housing the installed sprinkler assembly 100 therein. The tubular body preferably defines a substantially circular cylindrical geometry about the central axis X-X and defines an aerosol shield 16 of the protective cap 10. The aerosol shield 16 can define alternative non-circular cylindrical geometries such as, for example, a rectangular cylindrical, a square cylindrical geometry or an oval cylindrical geometry about the central axis X-X provided the internal chamber 18 of the tubular body can house and protect the installed sprinkler assembly 100 in a manner as described herein. Preferred embodiments of the protective cap 10 described herein are preferably formed from a polymer or plastic material such as, for example, polyethylene and formed by molding such as, for example, injection molding. Moreover, the preferred cap 10 is formed with a sufficient rigidness and/or material thickness to protect the sprinkler assembly 100 from accidental impact and damage. Alternatively or additionally, the material of the cap can be thermally responsive so as to melt and/or change shape in the presence of sufficient heat to increasingly facilitate communication of heated air or gases into the internal chamber of the protective cap 10 in order to thermally actuate the sprinkler assembly 100, yet provide for a structure that can be displaced from the assembly 100 upon fluid discharge from the actuated sprinkler at least at the minimum operating pressure of the sprinkler.

The open receiver end portion 12 of the protective cap 10 is preferably configured to axially receive the installed sprinkler assembly 100 and to engage the sprinkler assembly 100 to maintain the protective cap 10 about the sprinkler. More preferably, the open receiver end portion 12 forms a gription surface engagement to secure the protective cap 10 about the sprinkler assembly 100. In a preferred sprinkler installation as shown in FIG. 1A, the sprinkler assembly 100 includes the escutcheon plate 102 disposed about the automatic fire protection sprinkler. The protective cap 10 is located preferably proximate the escutcheon plate 102. More particularly, the open receiver end portion 12 of the protective cap is configured to form a preferred gription surface engagement with a peripheral surface of the escutcheon plate 102 circumscribed about the central axis X-X. Depending upon the geometry of the escutcheon 102, the peripheral surface of the escutcheon 102 can be circular, rectangular, square, polygonal or elliptical. Accordingly, the open receiver end portion 12 can be shaped accordingly to provide the preferred gription surface engagement with the escutcheon 102. In an alternate embodiment not shown, the open receiver end portion 12 can be configured to form a surface engagement about another sprinkler component that is directly or indirectly affixed to the sprinkler. The open receiver end portion 12 preferably includes a plurality of a gription segment 20 angularly spaced from one another about the central longitudinal axis X-X and extending from the aerosol shield 16.

Figure 2A:
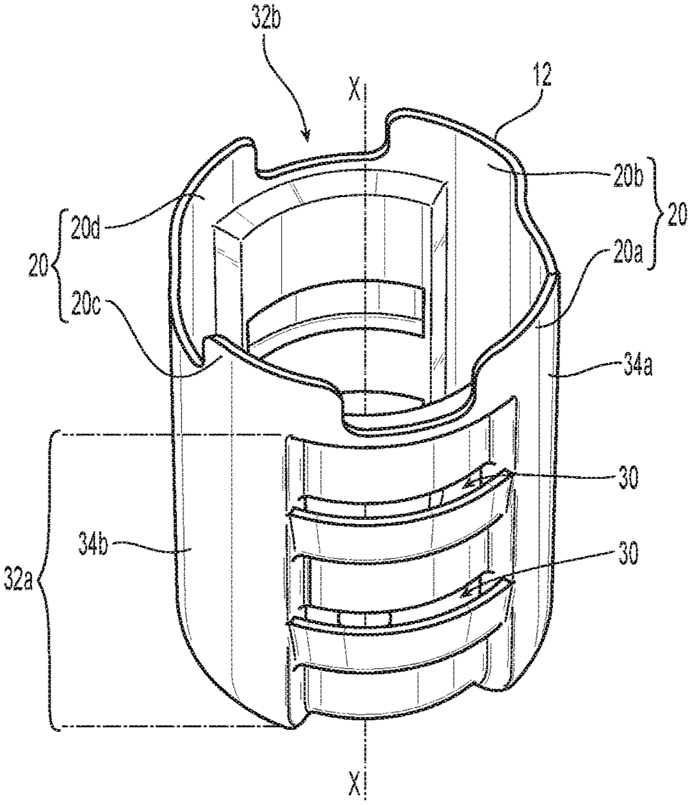
FIGS. 2A-2B are perspective views of a preferred embodiment of a protective cap for use in the protected sprinkler assembly of FIG. 1.

In the preferred embodiment shown with reference to FIG. 2A, the open receiver end portion 12 includes four gription segments 20*a*, 20*b*, 20*c*, 20*d* equiangularly spaced apart about the central longitudinal axis X-X. In the preferred cap 10, the spaced apart gription segments 20 define a terminal edge 36 of the protective cap circumscribed about the central longitudinal axis X-X. The terminal edge 36 includes a first group of edges 36*a* disposed in a first plane P1 perpendicular to the central longitudinal axis and at least a second group of edges 36*b* disposed in a second plane P2 perpendicular to the central longitudinal axis X-X. The first plane P1 and the second plane P2 are axially spaced apart along the central longitudinal axis X-X. Each gripping portion 20 extends preferably axially from the second plane P2 and preferably includes an arcuate internal surface that is curved about the central axis X-X for forming the preferred frictional engagement about the sprinkler assembly 100.

The gription segments 20 are preferably spaced apart to define the preferred gription surface engagement with the sprinkler assembly 100 and more preferably with the peripheral surface of the escutcheon plate 102 to locate and secure the protective cap 10 about the installed sprinkler assembly 100. The preferred frictional engagement is sufficient to secure the cap 10 about the sprinkler and provide protection against accidental impact during construction operations. Although the cap 10 is preferably shown secured to the escutcheon plate 102, it should be understood that the cap 10 can be configured to engage other supporting structures of the sprinkler or surrounding the sprinkler provided the cap 10 can house, surround and protect the installed sprinkler in its unactuated state.

In another preferred aspect of the frictional engagement between the cap 10, the engagement is temporary in the sense that the cap 10 preferably disengages from the sprinkler assembly 100 upon sprinkler actuation and/or fluid discharge to be clear of the installed sprinkler assembly 100 and its spray or discharge pattern. With reference to the preferred embodiments of FIGS. 1 and 1A, upon sprinkler actuation in thermal response to a fire event and/or a sufficient level of heat, the thermally responsive trigger or element 104 operates to release the seal assembly of the sprinkler assembly 100. Fluid delivered to the sprinkler assembly 100 at the minimum operating pressure of the sprinkler of 7 psi. or greater is discharged and distributed by the sprinkler assembly 100. The trigger operation and/or the fluid discharge is sufficient to disengage the protective cap 10 from its preferred temporary securement about the sprinkler assembly 100. Accordingly, the preferred gription surface engagement is configured to break or disengage from the sprinkler upon a fluid discharge from the sprinkler at the minimum operating pressure, preferably at least 7 psi., or greater.

Moreover, the frictional securement or gription of the cap 10 can be preferably broken by a sufficient level of manual manipulation of the cap. Accordingly, at the conclusion of construction operations, the sprinkler 100 can be uncovered by manually removing the cap 10 so that the sprinkler assembly 100 and the fire protection system can be placed into a final state of service. Preferably, the frictional engagement of the cap 10 with the escutcheon plate 102 permits the cap 10 to be axially pulled from its securement by installers or construction personnel.

In the unactuated state of the installed sprinkler, the protective cap 10 protects the sprinkler assembly 100 from accidental impact or debris such as, for example, aerosol paint spray or dust from construction operations. Accordingly, the closed terminal end portion 14 opposite the open receiver end 12 is preferably a continuous solid surface to shield the sprinkler assembly 100 axially in a direction from the terminal end portion 14 toward the receiver end 12. Moreover, the preferred aerosol shield 16 includes an arrangement of surfaces about the central axis X-X to shield the sprinkler assembly 100 radially with respect to the internal chamber 18 and the central axis X-X. Notwithstanding however, the aerosol shield 16 also includes one, and preferably more than one, transverse gap, relative to the central axis X-X, that defines a preferred shielding opening 30 peripherally located, oriented and configured to permit heat to flow therethrough for thermal actuation of the sprinkler assembly 100 housed within the cap 10. More specifically, the plurality of shielded openings 30 are preferably located between the open receiver end portion 12 and the closed terminal end portion 14 and in fluid communication with the internal chamber 18 sufficient to permit thermal actuation of the installed sprinkler assembly 100 in a preferred manner as described herein.

Figure 2B:
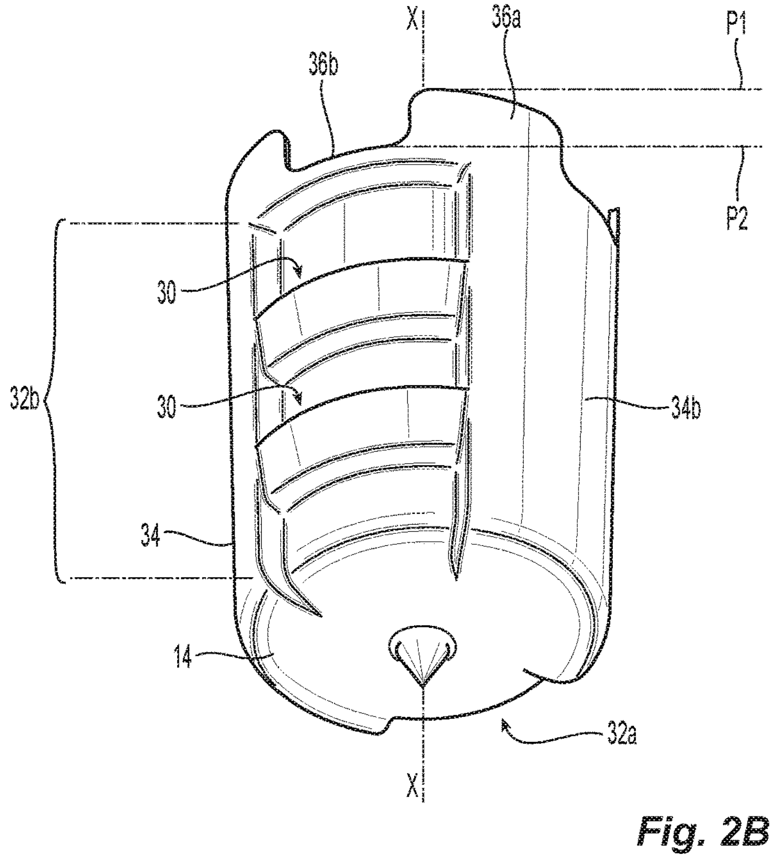
Figure 3A:
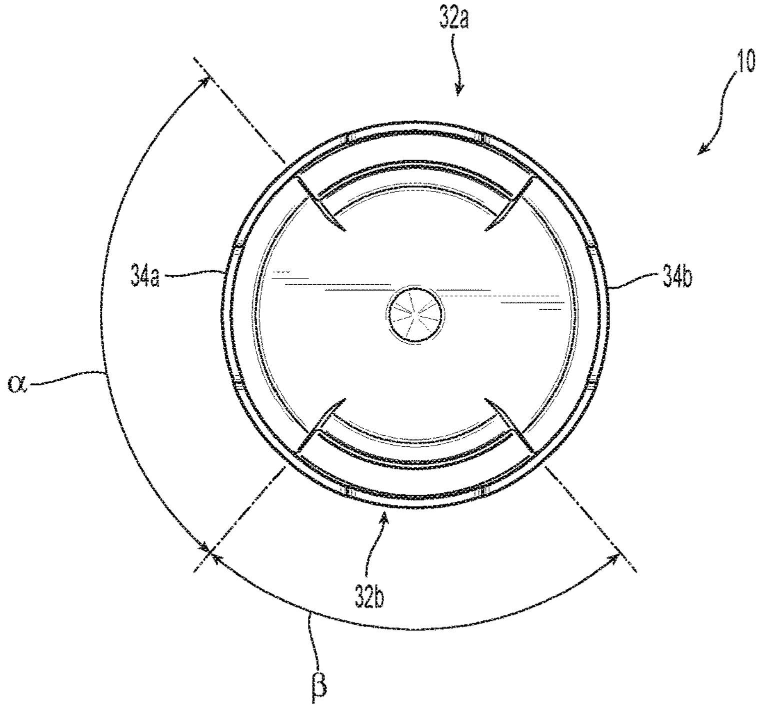
FIG. 3A is a plan end view of the protective cap of FIGS. 2A-2B.
Figure 3B:
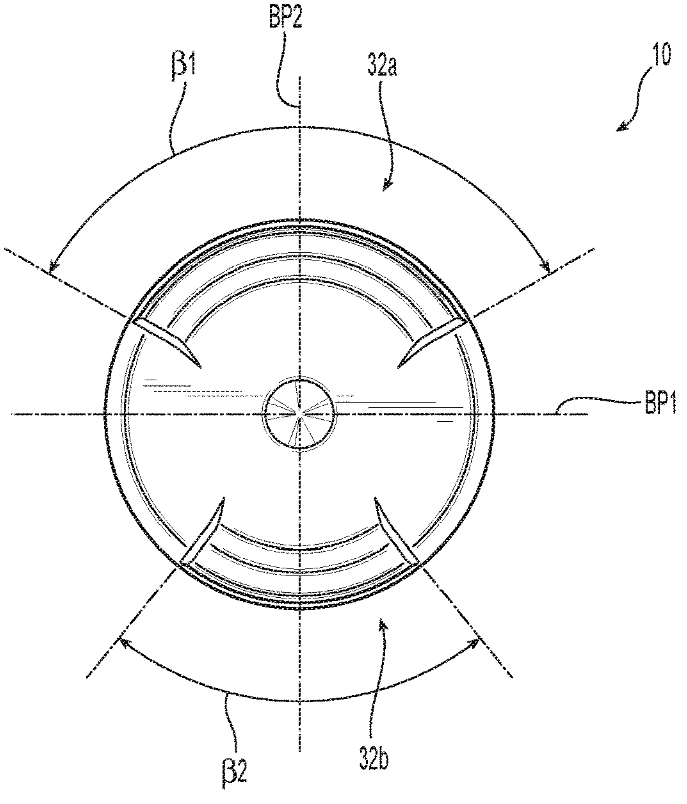
FIG. 3B is a plan end view of another preferred embodiment of a protective cap for use in the protected sprinkler assembly of FIG. 1.

Additionally, the configuration of each shielded opening 30 individually and/or the arrangement of the openings 30 collectively preferably permit or facilitate disengagement of the preferred gription surface engagement and displacement of the cap 10 clear of the sprinkler assembly 100 and its fluid distribution upon sprinkler actuation and/or fluid discharge at the minimum operating pressure or greater. With reference to the preferred embodiment of the protective cap 10 shown in FIGS. 2A and 2B, the openings 30 formed in the aerosol shield 16 are preferably axially or linearly aligned with one another into two groups within two louver channels 32*a*, 32*b* that are preferably diametrically opposed from one another about the receiver end portion 12. The aerosol shield 16 also preferably defines or forms a pair of connecting portions 34*a*, 34*b* that are opposed, and more preferably diametrically opposed, to one another to interconnect the louver channels 32*a*, 32*b* to one another. Each of the connecting portions 34*a*, 34*b* are preferably arcuate spanning an angular length 13 about the central axis X-X. The connecting portions 34*a*, 34*b* each preferably provide a continuous solid peripheral shielding surface of the cap 10. Moreover, each of the connecting portions 34*a*, 34*b* are preferably arcuate spanning an angular length a about the central axis X-X. The angular lengths a of the connecting portions 34*a*, 34*b* can be equal, as seen in FIG. 3A or vary from one another as seen in FIG. 3B. Depending upon the arc lengths of the connection portions 34*a*, 34*b* the angular lengths 13 of the opposed louver channels 32*a*, 32*b* can be equal or alternatively vary from one another. Thus, the protective cap 10 can be asymmetrical about a first bisecting plane BP1 and symmetrical about a second plane BP2 perpendicular to the first plane BP1 and intersecting one another at the central longitudinal axis. Alternatively, the protective cap 10 can be symmetrical about one or more of the bisecting BP planes through which the central longitudinal axis extends.

Figure 1B:
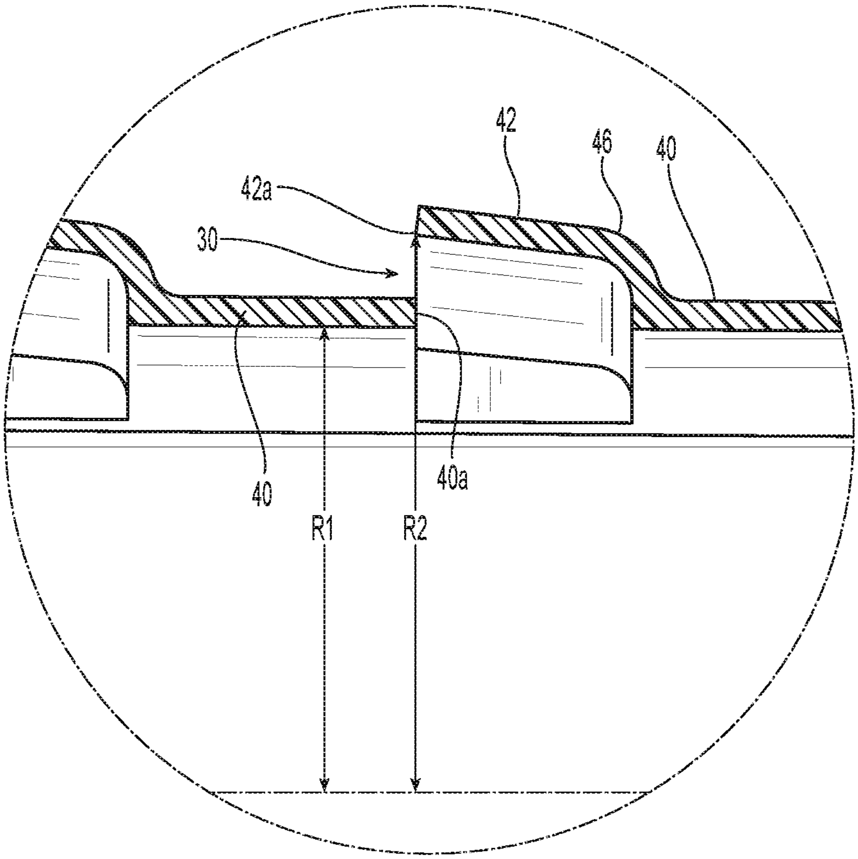
FIG. 1B is a detailed view of section IB-IB in FIG. 1.

In the preferred embodiment of the cap 10, the louver channels 32*a*, 32*b* are defined by portions of the tubular cap body or wall of different radii to form the preferred shielded openings 30 between the body portions. For example, as seen in FIG. 1, the wall of the tubular body includes a first body portion 40 that is at least partially circumscribed about the central longitudinal axis X-X to define a first radial distance R1. The tubular body also includes at least a second body portion 42 at least partially circumscribed about the central longitudinal axis X-X to define a second radial distance R2 that is greater than the first radial distance R1 so as to form a transverse gap between the first body portion 40 and the second body portion 42 that defines the preferred shielded opening 30 in fluid communication with the internal chamber 18 of the protective device 10. The radial distances R1, R2 respectively defined by the body portions 40, 42 can be constant. Alternatively or additionally body portions 40, 42 or parts thereof can be angled with respect to the central axis X-X or line parallel to the central axis X-X so that one or more of the radial distances R1, R2 are variable as seen, for example, in FIG. 1. With reference to FIG. 1B, a peripheral edge 40*a* of the first body portion 40 defines the first radial distance R1 and a peripheral edge 42*a* of the second body portion 42 defines the second radial distance R2 greater that the first radial distance R1 to form the transverse gap therebetween and define the preferred shielded opening 30. The peripheral edges 40*a*, 40*b* defining the transverse gap can be located relative to one another such that, geometrically, a ray extending normal to the area of the transverse gap and the resulting opening 30 can be orthogonal or skewed with respect to the central axis X-X.

In a preferred aspect, the first and second body portions 40, 42 are preferably alternately interleaved in the axial direction to form preferred angled slats of the louvered channel arrangement 32*a*, 32*b*. In another preferred aspect, axially adjacent portions 40, 42 are integrally formed with one another. As shown, a second body portion 42 is preferably integrally formed with a lower axially adjacent first body portion 40 to define a transition portion 46 of the protective cap 10. Accordingly, in preferred embodiments of the cap 10 the preferred shielded opening 30 and the transition portions 46 are preferably interleaved with one another. Moreover, the protective cap 10 is preferably formed with the transition portions 46 axially aligned with the opening 30. In the preferred louver channels 32*a*, 32*b*, the openings 30 is located closer to the open receiver end 12 than the axially adjacent transition portions 46. The second body portion 42 is preferably angled with respect to the central axis at an angle of ten degrees (10°) or less, and more preferably angled at seven degrees (7°) or less. The access to the preferred shielded openings 30 is preferably defined in a direction from the open receiver end 12 to the closed terminal end 14 to provide heat exchange through the internal chamber 18 for thermal detection by the thermally responsive element 104 of the sprinkler assembly 100. The formation of the transition portions 46 between the first and the second body portions 40, 42 limit or deny access to the internal chamber 18 in the direction from the closed terminal end 14 toward the open receiver end 12. Thus, the formation of the preferred openings 30 and the transition portions 46 provide for the preferred aerosol shield to limit the amount of debris and more particularly, aerosol spray paint, that can enter the internal chamber from construction or renovation operations performed around the installed sprinkler assembly 100. In the preferred embodiments shown, the shielded openings 30 themselves are fully exposed for unimpeded fluid flow therethrough.

Alternatively, the shielded opening 30 can be temporarily impeded by a full or partial covering or wrap that is thermally responsive so as to fully expose the opening 30 in the event of a fire. More specifically, the wrap can temporarily cover the openings 30 to prevent any spray or debris from entering, but then thermally respond by shrinking or contracting in response to a sufficient level of heat to uncover the opening 30 and permit the increasing entrance of heated gas or air into the internal chamber 18. In another preferred aspect or alternate embodiment, the protective cap 10 is made of a thermally responsive material that melts in the presence of a level of heat indicative of a fire. The melting of the cap material changes the geometry of the openings 30 so that the openings become enlarged to increase the fluid communication of heated air or gas into the internal chamber of the cap 10 for thermal operation of the thermally responsive element 104. Thus, where an opening 30 of the formed cap 10 defines a first geometry having an initial area or size, the opening 30 defines a second geometry having a preferably larger subsequent size or area after thermal exposure to a sufficient level of heat.

In particular embodiments of the cap 10, portions of the preferred aerosol shield 16 melt in a thermal response to a sufficient level of heat exposure to increase the size of one or more openings 30 of the cap 10. As previously noted, the openings 30 have an initial size to allow a sufficient flow of heated air or gas from a fire into the internal chamber 18 to thermally actuate the fire protection sprinkler 100 resulting in the discharge of firefighting fluid. The preferred aerosol shield 16 and its openings 30 also preferably permit a sufficient flow of firefighting fluid from the thermally actuated fire protection sprinkler to break the gription surface engagement with the sprinkler assembly and displace the protective cap 10 from the sprinkler 100. Additionally or alternatively, where the cap 10 is formed from thermally responsive material that melts in response to of the heat level, one or more shielded opening 30 increases in area to increase the flow of heated air or gas into the chamber 18 while maintaining a flow of firefighting fluid out of the internal chamber 18 from the thermally actuated fire protection sprinkler 100 to break the gription surface engagement and displace the protective cap. For example with reference to FIG. 1B, in particular preferred embodiments of the cap 10 in which the aerosol shield 16 includes a first body portion 40 at least partially circumscribed about the central longitudinal axis X-X defining a first radial distance R1; and a second body portion 42 at least partially circumscribed about the central longitudinal axis X-X defining a second radial distance R2 greater than the first radial distance R1 to form therebetween an initial area of one shielded opening 30 in the plurality of shielded openings, the second body portion 42 thermally responds to a sufficient level of heat and melts with the edge 42*a* of the second body portion moving away from the edge 40*a* of the first body portion such that the initial area of the opening 30 increases.

Preferably, the shielded openings 30 of the cap 10 are configured to provide sufficient access to the internal chamber 18 for heated air or gas to actuate the thermally responsive element or trigger assembly of the protected sprinkler assembly 100 with its designed, or at least an acceptable, level of thermal responsiveness or sensitivity. "UL Standard for Safety for Automatic Sprinklers for Fire-Protection Service, ANSI/CAN/UL/ULC 199" (13th ed. Feb. 25, 2022) ("UL 199") is a Joint Canada-United States National Standard that provides operational testing for fire protection sprinklers alone, i.e., without a housing or protective covering. Under the test standards, the thermal sensitivity of an unprotected sprinkler and its thermally responsive element is measured by determining the operating time of the sprinkler within a room of a particular size subject to particular installation arrangement and fire test parameters. Section 33 of UL 199, which is incorporated by reference, describes the parameters of "Room heat tests" and the time to sprinkler operation requirements for "Standard Response" sprinklers and "Quick Response" Sprinklers. Depending on the temperature rating of the sprinkler, a Standard Response sprinkler is required to operate within one of the following time limits: 120 seconds, 150 seconds, 189 seconds or 231 seconds. To meet the Quick Response sprinkler requirement, depending upon the sprinkler temperature rating, the sprinkler must operate within one of the following time limits: 55 seconds or 75 seconds.

Embodiments of the sprinkler assembly 100 housed within the preferred cap 10 were installed and tested in accordance with UL 199, Section 33 to evaluate the impact of the cap 10 on the thermal sensitivity of the sprinkler assembly 100 being protected. Generally, the room heat test is conducted by testing ten protected sprinklers in groups of five within an enclosed room measuring 15 ft. long, 15 ft. wide and 8 ft. high. The protected test sprinklers are located and installed and conditioned to a starting ambient temperature in accordance with the test parameters. A burner is located in a corner of the room to heat the test sprinklers to operation. The burner is configured and installed with a flow of gas as specified by the standard. In one preferred aspect of the tests, where the sprinkler assembly 100 housed within the cap 10 is a "Standard Response" sprinkler, the sprinkler preferably thermally actuated as a Standard Response sprinkler when housed within the protective cap 10. Alternatively, the protected sprinkler thermally responds within the protective cap at least with the thermal response of a Standard Sprinkler regardless of the thermal sensitivity of the sprinkler that is housed within the protective cap. Therefore, in another preferred aspect of the tests, the sprinkler assembly 100 thermally actuates at least as fast as a Standard Response sprinkler when housed within the protective cap 10 regardless of whether the protected sprinkler assembly 100 within the cap 10 is a "Quick Response" sprinkler or a Standard Response sprinkler. Thus, the cap 10 can provide for the desired sprinkler protection and an acceptable sprinkler thermal response in systems protecting construction sites or sites under renovation. More preferably, the cap 10 provides for a fire sprinkler housed therein and subjected to a heat room test, that its thermally responsive element 104 will actuate within the protective cap 10 in a time equivalent to a Standard Sprinkler tested in accordance with UL 199, Section 3. More particularly, preferred embodiments of the cap 10 constructed from a thermally responsive material and subjected to the heat room tests provide for openings 30 that increase in size due to the melting of portions of the cap 10 such that the resulting heat and gas flow into the internal chamber 18 cause the sprinkler 100 to actuate within the protective cap 10 in a time equivalent to a Standard Sprinkler and discharge fluid. The openings 30 of the melted cap 10 preferably maintain a flow of fluid from the cap 10 that will sufficiently break the surface engagement between the cap 10 and the sprinkler 100 and displace the cap 10 for effective fluid distribution from the exposed sprinkler.

Figure 2C:
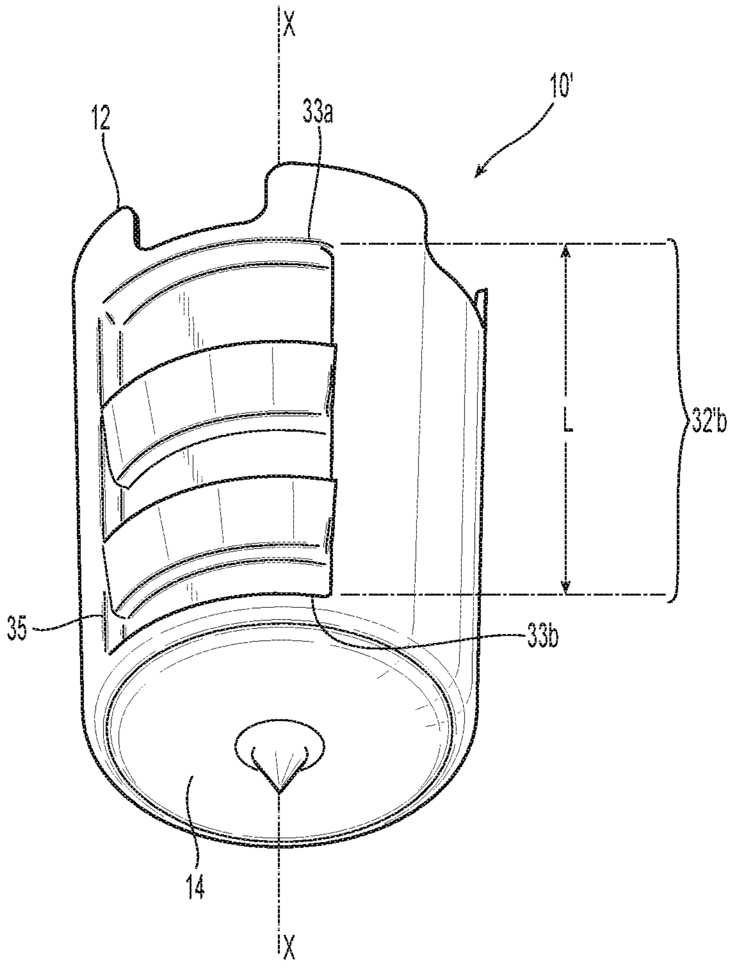
FIG. 2C is a perspective view of another preferred embodiment of a protective cap for use in the protected sprinkler assembly of FIG. 1.
Figure 3C:
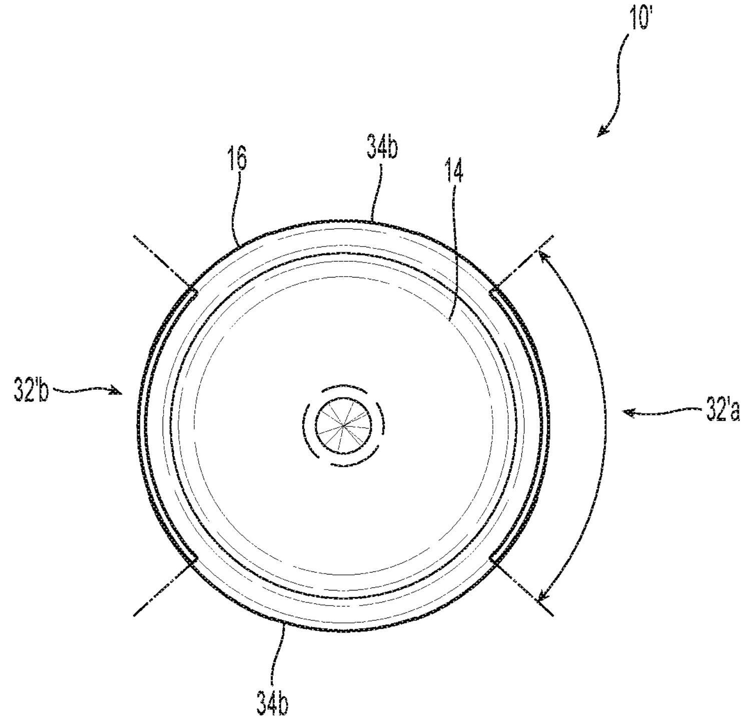
FIG. 3C is a plan end view of the protective cap of FIG. 2C.

In the embodiments of the protective cap 10 shown in FIGS. 2A and 2B and FIGS. 3A and 3B, the louver channels 32*a*, 32*b* extend axially through the closed terminal end 14. Accordingly, the angular lengths of the louver channels 32*a*, 32*b* are visible at the closed terminal end 14 of the protective cap 10. In an alternate preferred embodiment of the protective device 10' shown in FIG. 2C, an alternate embodiment of louver channel 32'*b* is shown located completely along the aerosol shield 16 between the open receiver end 12 and the closed terminal end 14. The preferred louver channel 32'*b* defines a first edge end 33*a* of the louver channel 32' and a second edge end 33*b* that is axially spaced from the first edge end 33*a* to define an axial length L of the channel 32'*b*. The first and second edge ends 33*a*, 33*b* of each louver channel, in combination with the angular length of the louver channel define a preferred closed-form frame 35 of the louver channel 32 that is completely formed along the aerosol shield 16 of the protective cap 10. Accordingly, without the louver channel formation extending into the closed terminal end 14, the closed terminal end 14, as shown in FIGS. 2C and 3C, defines a preferred circular periphery 14*a* about the center of the protective cap 10' and the central axis X-X of the cap 10'. In a preferred aspect of the protective cap 10', two closed-frames 35 of louver channels 32'*a*, 32'*b* are disposed along the aerosol shield 16 preferably diametrically opposed from one another. The two channels 32'*a*, 32'*b* can be identical or different and/or spaced such that the protective cap 10 is symmetrical or asymmetrical about one or more dividing planes extending through the central axis X-X.

While the present invention has been disclosed with reference to certain embodiments, numerous modifications, alterations, and changes to the described embodiments are possible without departing from the sphere and scope of the present invention, as defined in the appended claims. Accordingly, it is intended that the present invention not be limited to the described embodiments, but that it has the full scope defined by the language of the following claims, and equivalents thereof.

What is claimed is:

1. A protective cap for housing a fire protection sprinkler assembly having a trigger assembly and an escutcheon plate with a peripheral surface, the protective cap comprising:

an open receiver end portion defined by a plurality of gription segments angularly spaced apart about a central longitudinal axis to engage and partially circumscribe the peripheral surface of the escutcheon plate;

a closed terminal end portion opposite and axially spaced from the open receiver end portion along the central longitudinal axis; and an aerosol shield extending between the open receiver end portion and the closed terminal end portion, the aerosol shield being centered about the central longitudinal axis to define an internal chamber for housing the fire protection sprinkler assembly, the aerosol shield including at least one solid connecting portion extending along the central longitudinal axis from the open receiver end portion to the closed terminal end portion and at least partially circumscribed about the central longitudinal axis, at least one louver channel extending along the at least one solid connecting portion and disposed from the central longitudinal axis at a radial distance less than the at least one solid connecting portion, and a plurality of louvers extending across the at least one louver channel to form a plurality of shielded openings transverse to the central longitudinal axis for gas communication with the internal chamber to operate the trigger assembly.

2. The protective cap of claim 1, wherein the plurality of gription segments are equiangularly spaced about the central longitudinal axis and extend axially from the aerosol shield, each gription segment of the plurality of gription segments defining an internal arcuate surface curved about the central longitudinal axis.

3. The protective cap of claim 1, wherein the aerosol shield includes:

at least one first body portion at least partially circumscribed about the central longitudinal axis to define a first radial distance; and at least one second body portion at least partially circumscribed about the central longitudinal axis to define a second radial distance greater than the first radial distance so as to form a transverse gap between the at least one first body portion and the at least one second body portion to define one shielded opening in the plurality of shielded openings.

4. The protective cap of claim 3, wherein the at least one second body portion is angled with respect to the central longitudinal axis.

5. The protective cap of claim 3, wherein the at least one first body portion defines a constant radial distance about the central longitudinal axis; and the at least one second body portion defines a variable radial distance about the central longitudinal axis.

6. The protective cap of claim 3, wherein the aerosol shield includes a transition portion axially between the at least one first body portion and the at least one second body portion so as to be axially aligned with the one shielded opening, the one shielded opening being closer to the open receiver end portion than the closed terminal end portion.

7. The protective cap of claim 3, wherein the at least one first body portion and the at least one second body portion are interleaved with one another to define the at least one louver channel.

8. The protective cap of claim 7, wherein the at least one louver channel includes a pair of louver channels diametrically opposed from one another.

9. The protective cap of claim 8, wherein the at least one solid connecting portion includes a pair of arcuate connecting portions diametrically opposed from one another.

10. The protective cap of claim 8, wherein the protective cap is symmetrical about a first bisecting plane and asymmetrical about a second bisecting plane perpendicular to and intersecting the first bisecting plane along the central longitudinal axis.

11. The protective cap of claim 10, wherein the at least one louver channel has a first end and a second end defining a closed-formed frame along the aerosol shield.

12. The protective cap of claim 1, wherein the plurality of shielded openings provides a first fluid access to the internal chamber in a direction from the open receiver end portion toward the closed terminal end portion and a second fluid access in a radial direction with respect to the central longitudinal axis, the second fluid access being less than the first fluid access.

13. The protective cap of claim 1, wherein the protective cap is formed from a thermally responsive material with each shielded opening in the plurality of shielded openings defining a first geometry of a first size, wherein when the protective cap is exposed to a sufficient level of heat, the protective cap thermally responds such that at least one opening in the plurality of openings defines a second geometry having a second size that is larger than the first size.

14. The protective cap of claim 1, wherein the at least one louver channel extends in a direction from the open receiver end portion toward the closed terminal end portion.

15. The protective cap of claim 14, wherein the at least one louver channel includes a pair of diametrically opposed louver channels, each louver channel in the pair of diametrically opposed louver channels spans over an arc length about the central longitudinal axis.

16. The protective cap of claim 15, wherein the arc lengths of the pair of diametrically opposed louver channels are equal.

17. The protective cap of claim 15, wherein the arc lengths of the pair of diametrically opposed louver channels are different from one another.

18. The protective cap of claim 14, wherein the protective cap is asymmetrical about a first bisecting plane and symmetrical about a second bisecting plane perpendicular to the first bisecting plane, the central longitudinal axis being located along an intersection of the first bisecting plane and the second bisecting plane.

19. The protective cap of claim 14, wherein the protective cap is symmetrical about a first bisecting plane and symmetrical about a second bisecting plane perpendicular to the first bisecting plane, the central longitudinal axis being located along an intersection of the first bisecting plane and the second bisecting plane.

20. The protective cap of claim 14, wherein the at least one louver channel has a first end and a second end defining a closed-formed frame along the aerosol shield.

* * * * *